April 15, 1969  J. T. DONAHOO  3,439,244
SINGLE-PHASE ALTERNATING CURRENT MULTIVOLTAGE
INDUCTION MOTOR STATOR
Filed Feb. 23, 1967
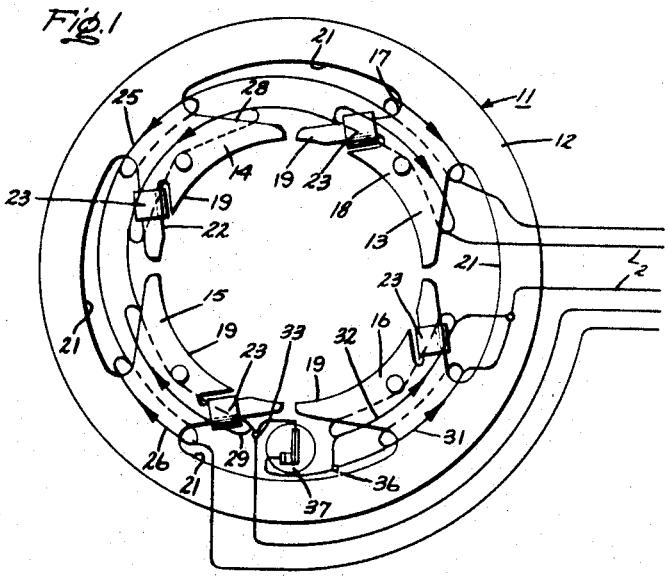
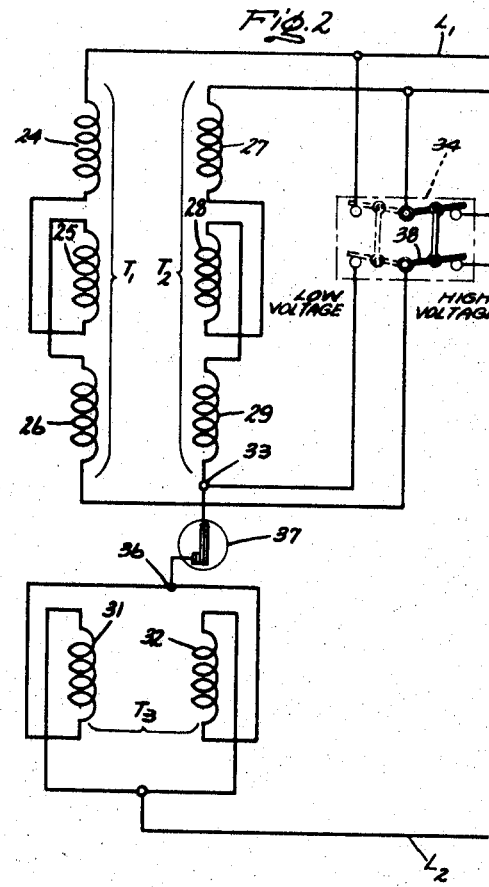
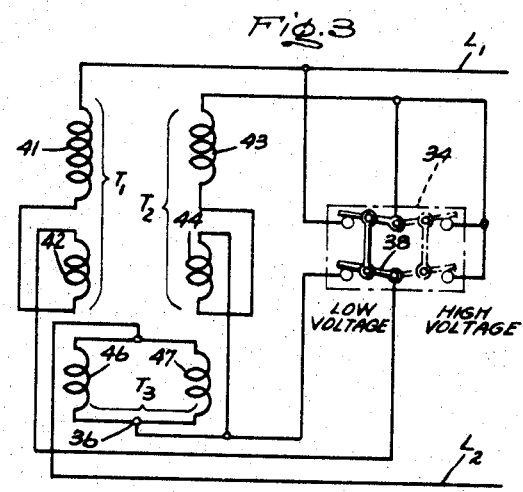
INVENTOR.
Joe T. Donahoo,
BY John M. Stoudt
Attorney.

United States Patent Office 3,439,244
Patented Apr. 15, 1969

3,439,244
SINGLE-PHASE ALTERNATING CURRENT MULTI-VOLTAGE INDUCTION MOTOR STATOR
Joe T. Donahoo, Fort Wayne, Ind., assignor to General Electric Company, a corporation of New York
Filed Feb. 23, 1967, Ser. No. 618,170
Int. Cl. H02p 1/42; H02k 17/04
U.S. Cl. 318—220  7 Claims

ABSTRACT OF THE DISCLOSURE

A single-phase alternating current multi-voltage induction electric motor adapted for appliance office equipment, and other applications, is selectively operative at high and lower rated voltage levels having a voltage ratio of other than 2. First, second, and third electrical coil means, respectively formed by conductor turn pluralities are carried by coil accommodating means in a stator core to produce at least two running poles. Under the high voltage level operation, a first and second coil means are connected in series circuit relation with each other and with a third electrical coil means. For the lower rated voltage level of operation, the first and second coil means are connected in parallel circuit relation with each other but still in series circuit relation with the third electrical coil means. Under both voltage levels of operation, the conductor turns for the third coil means have the same predetermined circuit relation with one another, for instance, approximately the same number of turns connected in a pair of parallel circuit paths. This arrangement is not only economical but, in addition, is capable of minimizing the potential concentration of heat for any one of the electrical coil means and provides a generally balanced power distribution through the electrical coil means.

Background of the invention

This invention relates to single-phase multivoltage alternating current induction electric motors, and more particularly to an improved stator for use in a single-phase A.C. dual-voltage induction type motor adapted for selective operation at either of two different voltage levels.

In recent years, there has been a growing demand in Europe and elsewhere for a single phase alternating current induction electric motor capable of satisfactory operation selectively at fifty cycles per second under a high and low rated voltage level having a ratio, high to low, other than the common integer of 2 for the conventional 230 and 115 rated voltage operating levels. More specifically, in one situation, power is supplied for single-phase voltage appliance and office equipment applications by a three phase power distribution system having line to line voltage of 220 volts and a line to neutral voltage of 127 volts, a non-integer ratio of 1.73 to 1.

Prior to the present invention, it has been proposed for this situation to provide a dual-voltage stator with a pair of windings which are connected in series circuit relation with one another for the high voltage operation and in parallel circuit relation for the lower rated voltage.

In view of the voltage ratio of 1.73 to 1, the series circuit connection for the high voltage operation has the lower volts per turn, flux density, and output of the two rated voltages. Consequently, to provide a satisfactory output, the critical output is usually that produced under the high voltage operation. However, with the two windings connected in parallel circuit relation for the lower voltage, there is not only an increase in output, but there is also at least a theoretical minimum increase in heat losses of 33%

$$\left(\frac{127 \text{ applied voltage}}{110 \text{ volts}}\right)^2$$

which occurs from the energized windings. At low voltage operation made at 110% of rated voltage, the loss theoretical minimum is increased to approximately 61%. The potential magnitude even of the minimum losses and winding temperatures are far in excess of those acceptable for the particular applications under consideration.

It is thus desirable to provide an improved stator for a single-phase, multi-voltage induction electric motor capable of satisfactory operation selectively at either a high or low rated voltage level, with the rated high to low voltage levels having a ratio other than 2:1. It is especially desirable that the motor be capable of providing sufficient output at the higher rated voltage level while at the same time maintaining heat losses, especially those resulting from energized coils under the lower rated voltage level of operation, as low as possible within acceptable limits for such applications as appliances and office equipment. These features should be attained by an arrangement which is also economical to build and is not overly complex in construction.

Consequently, it is a primary object of the present invention to provide an improved stator adapted for use in a single-phase multi-voltage induction electric motor selectively operable at several different rated voltage levels.

It is another object of the present invention to provide an improved yet economical stator member for use in a single-phase multi-voltage induction electric motor which is capable of selective operation at high and low rated voltage levels having a ratio other than 2:1, has a satisfactory output under the high rated voltage level, and has relatively low heat losses even at the low rated voltage level.

It is yet another object of the present invention to provide an improved stator for a single-phase multi-voltage induction electric motor having the desirable features mentioned above.

Summary of the invention

In carrying out the invention in one form, I provide an improved stator member adapted for use in a single-phase, multi-voltage induction electric motor selectively operable either at a high or low rated voltage level, with the ratio of the levels being other than two. The stator has a core which accommodates three sets of electrical winding or coil means respectively formed by a total number of conductor turns $T_1$, $T_2$ and $T_3$ which together define a number of primary or running poles. In salient pole structures, such as dual-voltage, shaded pole motors, conductor turns $T_1$ and $T_2$ are carried by a majority of salient pole sections while conductor turns $T_3$ are accommodated on a number of salient pole sections less than the majority.

Under the high rated voltage level of operation, the first and second coil means are selectively connectable in series circuit relation with each other and with the third coil means to provide a given number of primary or running poles. The conductor turns $T_3$ of the third coil means are also connected in a predetermined relation one to another. For instance, a selected number of turns $T_3$ may be connected in parallel circuit relation with other turns $T_3$, especially desirable where a given running pole includes turns from two of the coil means. Consequently, the turns of the given pole may be of the economical and advantageous bifilar type, being concurrently wound of two continuous strands of enameled wire by standard and low cost winding equipment. For some situations, all of the turns $T_3$ may be in series circuit with one another, with the cross-section area of the individual turns being twice that of the conductors $T_1$ and $T_2$ and one-half the number when the turns of $T_3$ are connected in a pair of parallel circuits.

Under the lower rated voltage level of operation, the first and second coil means are selectively connectable for energization in parallel circuit relation with respect to each other, each still being in series circuit relation with the third coil means which has turns $T_3$ in the same predetermined relation already mentioned in connection with the higher voltage level.

With the foregoing arrangement, it is possible to furnish satisfactory performance, including output and low heat losses, during both voltage levels of operation, even for appliances and office equipment applications where the overall performance must meet certain codes and standards. In addition, the arrangement is economical in nature and permits, if so desired, rapid installation of a thermal protector, such as a single standard heat sensing, circuit-interrupting device connected between the first and second coil means on the side, and the third coil means on the other side. Thus, the device is in circuit across the power input and may be positioned in heat transfer relation to at least some of the turns in all three coil means so that it is responsive to a predetermined heated condition which might rarely occur in any one or more of the coil means from some cause other than anything associated with use of the present invention. Consequently, the single device is capable of interrupting motor operation under either voltage level until the heated condition becomes abated or corrected.

The subject matter which I regard as my invention is particularly pointed out and distinctly claimed in the concluding portion of the specification. My invention, itself, however, both as to its organization and method of operation, together with further objections and advantages thereof may best be understood by reference to the following description taken in connection with the accompanying drawing.

*Brief description of the drawing*

In the drawing:

FIGURE 1 is an end elevational view, partially schematic of a stator member adapted for use in a single-phase, alternating current, multi-voltage induction electric motor selectively connectable for operation at high and low rated voltage levels, with the member having a four pole salient construction and incorporating one form of the present invention;

FIGURE 2 is a schematic winding circuit diagram for the stator of FIGURE 1; and

FIGURE 3 is a schematic winding circuit diagram of a second embodiment of the present invention as incorporated in a single-phase, two pole multi-voltage electric motor.

*Description of the preferred embodiments*

Turning now to the drawing in more detail and in particular to FIGURES 1 and 2, one preferred form of the present invention is illustrated in connection with a stator member adapted for use in a single-phase, alternating current, multi-voltage induction electric motor of the shaded pole type, capable of selective operation under two different rated voltage levels, $V_1$ and $V_2$. As will be seen hereinafter, by way of exemplification, the high rated level is 220 volts while the lower level is 127 volts, a rated voltage ratio for $V_1/V_2$ of 1.73:1. More specifically, the stator member, identified generally by reference numeral 11 in FIGURE 1, has a laminated magnetic core fabricated from a predetermined plurality of laminations which may be held together in stacked face-to-face relation by any suitable means (not shown). The core, for instance, may be similar to that disclosed more fully in the M. V. De Jean Patent 3,030,528 granted Apr. 17, 1962, and assigned to the same assignee as the present invention. In the illustrated form, the core has a generally annular yoke section 12 and four integral salient pole sections 13–16, each projecting radially inward from the yoke section. Each yoke section has a dimensionally reduced neck portion 17 adjacent the yoke section at the one end and at the other end an enlarged polar face 18, with an arcuate tip 19 on its innermost edge. The four salient pole sections are equally and angularly spaced apart such that the tips 19 together define a rotor receiving bore. The axial walls of the adjacent pole sections, together with the inner wall of the yoke section, define a plurality of coil accommodating slots 21 which correspond in number to the salient pole sections.

Still referring to FIGURE 1, each salient pole section is provided with a slot 22 extending inward from its pole face and spaced slightly from the edge pointing in the direction of rotation toward a suitable rotor member (not shown). A conventional shading coil or ring 23 is furnished with a side in the slot and surrounds that edge of the pole face to create the required lagging magnetic field furnished primarily for starting purposes. Standard flat copper bar stock may be employed to fabricate the shading coils 23.

The stator has three sets or winding sections of electrical coil groups respectively including a total number of conductor turns $T_1$, $T_2$, and $T_3$ which form the four running poles for the motor when energized under either voltage level of operation. In the illustrated embodiment, a majority of the salient pole sections 13–15 carry one coil group each of two winding sections, that is single coils 24, 25, and 26 of the first section and single coils 27, 28, and 29 of the second section. The fourth salient pole section 16 accommodates conductor turns $T_3$ of the third winding section which is provided by two groups of single coils 31, 32.

Under high voltage operation, the three coil sections are connected for energization across a suitable alternating current power source through lines $L_1$, $L_2$ to provide poles of alternate instantaneous polarity as shown by the arrows in FIGURE 1. More specifically, as best seen in FIGURE 2, coils 24, 25, and 26 are connected in series circuit with coils 27, 28, and 29, between line $L_1$ and common connection 33 through a conventional double pole, double through switch 34. Each of the first two sections is in turn in series circuit relation with conductor turns $T_3$ which are connected in a pair of parallel circuit paths in the form of coils 31, 32 in circuit between connection 36 and line $L_2$. Rather than employing switch 34 in the connection of the turns $T_1$, $T_2$, and $T_3$ in the desired relationships across lines $L_1$, $L_2$, any other suitable means could be utilized, such as terminals mounted on a common terminal board. For low voltage operation, this would necessitate a change of lead connections on the board from that for high voltage operation to attain the circuit relationships conveniently furnished by switch 34.

It is convenient with the illustrated arrangement to install a thermal protector 37, such as a standard heat sensing, circuit-interrupting device, between connections 33, 36 at the coil terminations of coils 29, 31, and 32 in series between the first two winding sections on the one side and the third section on the other. Thus, as seen in FIGURE 1, the device may be disposed in heat transfer relation with some conductor turns from each of the three winding sections so that it will be responsive to open the circuit between lines $L_1$, $L_2$ should a potentially dangerous temperature condition ever be reached in any one of the winding sections in the vicinity of the protector. One such device which may readily be used for this purpose is of the type disclosed in Patent 2,909,719 issued to C. A. Dubberley, with or without a finned construction.

For the lower voltage operation in the illustrated exemplification, coils 24–26 of the first winding section are connected in parallel circuit relation with coils 27–29 of the second section, both sections still being connected in series relation with coils 31, 32 of the third section in which the turns $T_3$ have the same circuit relation with one another as for the high voltage level of operation. To achieve these circuit interrelationships the movable contact arms 38 of switch 34 are moved to the positions shown in phantom in FIGURE 2. By connecting coils 31, 32 in parallel and having each coil in a given salient pole section wound of the same number of turns, it is convenient to employ a bifilar winding arrangement. That is to say, it is possible to wind each pair of coils concurrently from a double strand of enameled magnetic wire by conventional and commercially available winding equipment to effect considerable economy in the manufacture of stator 11.

For some situations, it may be desirable to employ all the conductor turns $T_3$ in series circuit relation with one another and still obtain the performance benefits of the present invention. This may be accomplished in the illustrated exemplification by providing salient pole section 16 with a single coil group formed by turns having twice the cross-section area of the individual turns of either $T_1$ or $T_2$, which should include about the same cross-section turn area. Further, for the series circuit relation of the turns $T_3$, the total number should approximate that contained in either one of the two parallel paths where the turns of $T_3$ are so divided.

As will be more apparent hereinafter, the present invention provides satisfactory output for the motor incorporating the invention even at the high voltage level. In spite of this, the motor does not tend to overheat or to generate heat primarily in any one of the three coil sections at the lower voltage level of operation. Thus, the motor is capable of use in situaitons, such as appliance and office equipment applications, where operating temperature and output at two different voltage levels as well as cost are all important factors.

The following example is given to show more clearly how the invention, as described above, has been carried out in actual practice and to reveal the benefits which may result from its use. A stator member having the core configuration and coil deployment illustrated in FIGURE 1 was incorporated in a four pole, single-phase multi-voltage induction motor adapted for selective operation at fifty cycles per second respectively under 220 and 127 rated voltage levels. The rotor was of standard construction, having a magnetic core accommodating a squirrel cage cast aluminum winding with 24 bars short-circuited at each end by end rings. The stator core of the exemplification had the following nominal dimensions:

|   | Inches |
|---|---|
| Bore diameter | 1.775 |
| Outer peripheral diameter | 3.200 |
| Stack length | 2.0 |

The stator core accommodated two coils per pole in the illustrated manner, with all of the coils being wound of 0.0126 inch diameter copper having an adherent insulating covering of class 130 insulating material (I.E.E.E. No. 1, December 1962, Table I–5). Each coil in turn included one hundred ninety (190) conductor turns. Thus, the total conductor turns $T_1$, $T_2$, and $T_3$, for the three respective sections of coils was 570, 570, and 380. Circuit-interrupting device 37 was set to open at 130° centigrade and to reclose at 110° centigrade. The motor was installed in office equipment, e.g., an electric typewriter having an ambient of 51.0° centigrade, and performed as follows:

| Voltage levels | Maximum coil temperature in degrees centigrade | Maximum torque output |
|---|---|---|
| 220 volts (high level) | Less than 112 | 3.552 ounce ft. at 1,210 r.p.m. |
| 127 volts (low level) | Less than 112 | 3.91 ounce ft. at 1,210 r.p.m. |
| 140 volts (110% of the low level) | 112.2, total coil heat loss of 74.5 watts. | |

For this application, the maximum torque output of 3.552 ounce feet for the high voltage level was more than sufficient and was merely 9.2% under the maximum output of the lower voltage level. In spite of this desirable output performance, the maximum coil temperature did not exceed 113° centigrade, even when the motor was operated under 110% of the lower rated voltage level, a temperature well below the operating limit of 130° C. for the thermal protector 37 and within accepted temperature and heat loss standards for the particular application. Moreover, in view of the unusually low coil temperatures and heat losses involved for both voltage levels, the insulation system (including ground insulation, wire enamel, etc.) was the well-known and relatively inexpensive "B" system having an acceptable upper limit of 120° C. rather than requiring a higher temperature and more expensive insulation system.

For best results in obtaining a generally balanced performance and an optimum power distribution through the coils considering both of the rated voltages even though the high voltage is not double that of the lower one, and in avoiding a tendency or potential concentration of heat in any one of the coil sections during operation, the total number of turns $T_1$ should approximately the total number of turns $T_2$. In addition, with conductor turns $T_3$ being in the illustrated parallel circuit relation shown in FIGURES 1 and 2, the turns of coils 31, 32 in the parallel paths should be approximately equal. It has been found in actual practice that to derive the maximum performance benefits under these circumstances, the numerical quotient of $V_1/V_2$, when other than 2, should approximate the numerical quotient of $$\frac{2T_1+\frac{T_3}{2}}{T_1+\frac{T_3}{2}}$$

where $T_1$ includes about the same number of turns as $T_2$. In the specific example given above, $V_1/V_2$ was 1.73 while the other quotient was 1.75. To insure maximum performance benefits, any variation between the quotients should not exceed ±8% based upon the quotient of $V_1/V_2$. Generally speaking, this may readily be achieved by maintaining the conductor turns of $T_1$ and $T_2$ in a majority of the running poles and the conductor turns of $T_3$ in a less number of the running poles.

It should be recognized by those skilled in the art from the above that the present invention is not limited to the illustrated embodiment of FIGURES 1 and 2. For instance, single-phase multi-voltage motors incorporating split phase distributed wound coils may advantageously employ the present invention. In one arrangement character references 24–29 and 31, 32 in FIGURE 2, rather than identifying turn groups comprised of single coils, would designate groups formed of a plurality of concentric coils, carried by any suitable type of core, for instance the one shown in the L. Mollenberg Patent 2,860,296, issued Nov. 11, 1958. The motor would also have an auxiliary winding having its coil groups displaced in phase from the groups shown in FIGURE 2 for starting purposes. In addition, as will now be seen from a consideration of FIGURE 3, the present invention is not limited to four pole operation but may be incorporated in single-phase, multi-voltage motors operative at each voltage level having at least two running poles.

In FIGURE 3, like parts are identified by like character references employed in connection with the first illustrated embodiment. The motor having the running winding arrangement of FIGURE 3 is adapted to operate on two running poles of opposed instantaneous polarity in which coil or groups of turns 41 and 43 respectively of the first two winding sections are in one pole. Coils or groups of turns 42, 44 of the first two winding sections and groups of turns or coils 46, 47 of the third section are in the second pole, whether of the concentric distributed wound or shaded pole concentrated coil type single-phase motor. Consequently, during the high voltage operation, conductor turns $T_1$ in the form of turn groups 41, 42 are once again in series circuit relation with conductor turns $T_2$ provided by turn groups 43, 44. These turn groups are each in series circuit relation with turns $T_3$ furnished by the parallel connected groups 46, 47. Since groups 42, 44 are in the same pole as the conductor turns $T_3$, the direction of current flow should be in the same direction through these individual conductor turns.

Like the first embodiment already described, for the lower voltage level of operation, switch 34 places turns $T_1$ and $T_2$ in parallel circuit relation with one another, but the turns $T_3$ still retain the same predetermined circuit relation as furnished for the high voltage level of operation. Consequently, the motor has the same beneficial features and advantages already mentioned in connection with the first embodiment.

It should be noted at this time that in the second embodiment, the majority of the poles include turns $T_1$ and $T_2$. In addition, in order to derive the maximum benefits of the present invention, the numerical quotient of the expression $$\frac{2T_1+\frac{T_3}{2}}{T_1+\frac{T_3}{2}}$$

may readily be made to approximately $V_1/V_2$ when this latter quotient is other than two. Assuming for example that $V_1/V_2$ again equals 1.73, turn groups 41 and 43 may include 350 turns and groups 42, 44 may each have 163 turns to furnish a total of 513 turns for $T_1$ and $T_2$. $T_3$ could then have a total of 374 turns, 187 turns in each parallel circuit path. This provides a quotient of 1.74 and the type of overall performance already outlined in connection with the first embodiment.

It should be apparent to those skilled in the art, while I have shown and described what at present is considered to be the preferred embodiment of my invention in accordance with the patent statutes, it is to be understood that modifications can be made without actually departing from the true spirit and scope of this invention, and I therefore intend to cover in the following claims all such equivalent variations as fall within the invention.

What I claim as new and desire to secure by Letters Patent of the United States is:

1. In a single-phase alternating current multivoltage shaded pole induction motor, a stator member comprising a core having a number of angularly spaced apart salient pole sections; first and second electrical coil means respectively having a plurality of conductor turns $T_1$ and $T_2$ carried by a majority of the salient pole sections; third electrical coil means formed by a plurality of conductor turns $T_3$ accommodated on less than a majority of said salient pole sections; said first and second electrical coil means being selectively connectable for energization under one rated voltage level $V_1$ of motor operation in series circuit relation with each other, and each being concurrently in series circuit relation to said third electrical coil means, with the plurality of conductor turns $T_3$ having a predetermined circuit relation with one another; and said first and second electrical coil means being selectively connectable for energization in parallel circuit relation with each other, and each being connectable in series circuit relation to said third electrical coil means under another rated voltage level $V_2$, with said conductor turns $T_3$ having the same predetermined circuit relation with one another; whereby heat loss produced by the energized electrical coil means during motor operation may be maintained below a preselected limit for the one and the another rated voltage levels.

2. The stator member of claim 1 in which the ratio of $V_1/V_2$ is other than 2:1, conductor turns $T_1$ and $T_2$ are carried by the same salient pole sections and have approximately the same number of conductor turns on a given salient pole section, and the number of conductor turns $T_3$ are less in number than either of the total conductor turns $T_1$ or $T_2$.

3. The stator member of claim 1 in which the predetermined circuit relation of conductor turns $T_3$ with one another comprises a pair of parallel circuit paths having approximately the same number of conductor turns in each of said paths.

4. In a single-phase alternating current multivoltage induction motor adapted for selective operation at high and lower voltage levels $V_1$, $V_2$, a stator member comprising a core having coil accommodating means; first, second and third electrical coil means respectively defined by conductor turns $T_1$, $T_2$, and $T_3$ and being carried in the coil accommodating means to form together at least two running poles when energized at the high and lower voltage levels; said first and second electrical coil means being selectively connectable for energization in series circuit relation with each other and each being in series circuit relation to said third electrical coil means under the high rated voltage level $V_1$ of motor operation, with conductor turns $T_3$ having a predetermined circuit relation with one another; said first and second electrical coil means being selectively connectable for energization in parallel circuit relation with each other and each being in series circuit relation to said third electrical coil means when the motor is operated under the lower rated voltage level $V_2$, with conductor turns $T_3$ having the same predetermined circuit relation with one another; whereby heat losses produced by the energized electrical coil means during motor operation may be effectively controlled.

5. The stator member of claim 4 in which a heat sensing, circuit-interrupting device is connected in circuit between said first and second electrical coil means on the one side and said third electrical coil means on the other side, said device being disposed in heat transfer relation with at least some of the conductor turns for all three of the electrical coil means, whereby during a heated condition above a predetermined temperature in one or more of said electrical coil means the device operates to interrupt energization of the conductor turns $T_1$, $T_2$, and $T_3$ at either of the rated voltage levels.

6. The stator member of claim 4 in which conductor turns $T_1$ and $T_2$ are disposed in the same running poles and include approximately the same total number of conductor turns; and the predetermined circuit relation of conductor turns $T_3$ with one another includes approximately the same number of conductor turns connected in at least two parallel circuit paths, whereby a potential concentration of heat for any one of the electrical coil means is minimized and a generally balanced power distribution through the electrical coil means is effected for said high and said lower rated voltage levels.

7. The stator member of claim 6 in which the numerical quotient of $V_1/V_2$ is other than 2 and approximates the numerical quotient of $$\frac{2T_1+\frac{T_3}{2}}{T_1+\frac{T_3}{2}}$$

References Cited

UNITED STATES PATENTS

| | | | |
|---|---|---|---|
| 1,912,207 | 5/1933 | Kennedy | 318—225 |
| 2,243,070 | 5/1941 | Cain | 318—225 XR |
| 2,464,756 | 3/1949 | Trickey | 318—225 XR |
| 2,619,621 | 11/1952 | Brown | 318—225 XR |
| 2,630,553 | 3/1953 | Seely | 318—225 |
| 2,632,876 | 3/1953 | Willits | 318—225 |

ORIS L. RADER, *Primary Examiner.*

G. Z. RUBINSON, *Assistant Examiner.*

U.S. Cl. X.R.

318—225